United States Patent [19]
Park

[11] Patent Number: 5,881,141
[45] Date of Patent: Mar. 9, 1999

[54] DATA COMMUNICATION CIRCUIT AND METHOD USING TELEPHONE SYSTEM

[75] Inventor: Joo-Seung Park, Gumi, Rep. of Korea

[73] Assignee: SamSung Electronics Co., Ltd., Suwon, Rep. of Korea

[21] Appl. No.: 679,921

[22] Filed: Jul. 15, 1996

[30] Foreign Application Priority Data

Jul. 14, 1995 [KR] Rep. of Korea .................. 1995 20774

[51] Int. Cl.$^6$ ............................ H04M 17/00; H04M 1/00
[52] U.S. Cl. ........................... 379/155; 379/434; 379/440; 379/454
[58] Field of Search ..................................... 379/143, 146, 379/147, 149, 150, 155, 201, 185, 93.09, 93.11, 100.15, 100.16, 195, 164, 165, 168, 171, 434, 440, 454

[56] References Cited

U.S. PATENT DOCUMENTS

| | | |
|---|---|---|
| 4,367,374 | 1/1983 | Serrano . |
| 4,660,218 | 4/1987 | Hashimoto . |
| 4,849,815 | 7/1989 | Streck ...................................... 379/100 |
| 4,856,046 | 8/1989 | Streck et al. ............................... 379/56 |
| 4,900,905 | 2/1990 | Pusic . |
| 4,903,290 | 2/1990 | King ......................................... 379/52 |
| 4,991,200 | 2/1991 | Lin . |
| 5,018,189 | 5/1991 | Kurosawa et al. . |
| 5,023,903 | 6/1991 | Bowen ...................................... 379/67 |
| 5,046,085 | 9/1991 | Godsey et al. ............................ 379/112 |
| 5,065,427 | 11/1991 | Godbole . |
| 5,105,460 | 4/1992 | Williams ................................. 379/440 |
| 5,187,736 | 2/1993 | Moriizumi . |
| 5,272,747 | 12/1993 | Meads . |
| 5,327,486 | 7/1994 | Wolff et al. ............................... 379/96 |
| 5,333,181 | 7/1994 | Biggs ........................................ 379/91 |
| 5,393,964 | 2/1995 | Hamilton et al. ........................ 379/453 |
| 5,428,673 | 6/1995 | Nakagawa et al. . |
| 5,444,770 | 8/1995 | Davis et al. . |
| 5,493,609 | 2/1996 | Winseck, Jr. et al. ..................... 379/96 |
| 5,621,539 | 4/1997 | Brown et al. ............................ 379/100 |

*Primary Examiner*—Paul Loomis
*Assistant Examiner*—Rexford N. Barnie
*Attorney, Agent, or Firm*—Robert E. Bushnell, Esq.

[57] ABSTRACT

A pay phone capable of establishing data communications between a notebook computer and a remote communication device over a telephone line as well as voice communications between a telephone handset and a remote communication device over the same telephone line. The pay phone has a data communication circuit comprising a voice switching unit including a tip and ring switches which are connected to a central office line to receive voice data and a ring signal, respectively; a key input unit having a data communication key, a data communication change-over key and a numeric key pad; a voice communication unit having a handset for establishing voice communications when said tip and ring switches of the voice switching unit are switched-on; a tone detecting unit for detecting a calling tone in tone signals received from the central office line; a data switching unit having a tip and ring switches connected to the central office line for establishing data communications; and a control unit for controlling operations required for the voice communications and data communications in response to inputs of the calling tone, the data communication key signal and the data communication change-over signal.

17 Claims, 2 Drawing Sheets

DATA COMMUNICATION CIRCUIT AND METHOD USING TELEPHONE SYSTEM

CROSS-REFERENCE TO RELATED APPLICATION

This application makes reference to, incorporates the same herein, and claims all benefits accruing under 35 U.S.C. §119 from an application for *Data Communication Circuit And Method Using Telephone System* earlier filed in the Korean Industrial Property Office on 14 Jul. 1995 and there duly assigned Ser. No. 20774/1995.

BACKGROUND OF THE INVENTION

1. Technical Field

The present invention relates to a telephone system, and more particularly to a data communication circuit of a telephone system having a data communication terminal for allowing a user to establish either voice communication or data communication when a portable communication device such as a notebook computer is connected to the data communication terminal of the telephone system.

2. Background Art

Generally, communication systems such as telephone systems and facsimile systems having telephone handsets today are capable of allowing subscribers to establish voice or telephone communication as well as data communication over a single telephone line. Such facsimile systems are disclosed, for example, in U.S. Pat. No. 5,018,189 for *Communication Apparatus With Telephone And Data Communication Capability* issued to Kurosawa et al., and U.S. Pat. No. 5,428,673 for *Data Communication Apparatus Having The Function Of Automatically Switching Data Communication And Telephone Communication* issued to Nakagawa in which internal switching devices are provided to automatically switch data communication and telephone communication. These conventional switching device may be constructed external to the facsimile systems and alternatively telephone systems such as disclosed in U.S. Pat. No. 4,660,218 for *Apparatus For Switching Telephone Line A Response Device, A Data Terminal Or A Telephone* issued to Hoshirnoto, U.S. Pat. No. 4,991,200 for *Interface Device For The Intercommunication Of A Computer And A Fax Machine* issued to Lin and U.S. Pat. No. 5,187,736 for Telephone Data Communication Switching System issued to Moriizumi so that different communication systems can effectively share the same telephone line.

Conventional telephone systems also include switching arrangements to accommodate both voice and data communication over a single telephone line. For example, in U.S. Pat. No. 4,367,374 issued to Serrano and U.S. Pat. No. 4,907,267 issued to Gutzmer, a manually operated switch is inserted between a telephone handset and base to allow both voice and data transmission. When the switching arrangement is used with a computer system or a facsimile machine, the user must manually take the telephone handset off-hook and place a call to a remote station. When the remote station answers the call, the user must then manually prompt the modem to go off-hook and begin communications with the remote station. While the switching arrangement may be made automatic as disclosed, for example, in U.S. Pat. No. 5,444,770 for *Telephone Handset Interface For Automatic Switching Between Voice And Data Communications* issued to Davis et al., the switching between voice and data communications during a conversation remains the same and the interface device connected between the telephone handset and base to selectively couple a modem to the telephone base for data communications remains complex and sensible only in offices and home.

As portable communication devices such as notebook computers become increasing common in today business environment however, there is a need to facilitate data communications over conventional telephone systems and particularly to those telephone systems that are accessible to the public so that the users of the notebook computers can simply plug their notebook computers into the telephone systems to establish data communications over a shared telephone line.

SUMMARY OF THE INVENTION

Accordingly, it is an object of the present invention to provide a data communication circuit of a public telephone system for accommodating both voice and data transmission over a telephone line.

It is another object to provide a data communication circuit of a telephone system for allowing a user to connect a portable communication device such as a notebook computer to the telephone system to establish data communications as well as voice communications over a telephone line.

These and other objects can be achieved by a novel data communication circuit of a public telephone system having a voice switching unit including a tip and a ring switches which are connected to a central office line to receive voice data and a ring signal, respectively. A key input unit having a data communication key, a data communication change-over key and an alphanumeric key pad for allowing a user to select between voice communications and data communications. A voice communication unit having a telephone handset is connected to the voice switching unit to establish voice communications between the telephone handset and a remote communication device over the central office line, when said tip and ring switches of said voice switching means are switched-on. A tone detecting unit is connected to the voice switching unit to detect a calling tone received from said central office line. A data switching unit having a tip and ring switches which are connected to said central office line to establish data communications between a portable data communication device connected to the telephone system with the remote communication device over the central office line, when said tip and ring switches of said data switching unit are switched-on and said tip and ring switches of said voice switching unit are switched-off. A control unit is operatively connected to control the voice communications between the telephone handset and the remote communication device over the central office line, and the data communications between the portable data communication device connected to the telephone system with the remote communication device over the central office line in response to selection of one of the data communication key and the data communication change-over key by the user and the calling tone received from the central office line.

A data communication process of such a telephone system can be obtained by first establishing data communications between the portable data communication device and the remote communication device over a central office line in a data communication mode, when the portable data communication device is connected to the telephone system and when said data communication key has been depressed. When the data communication key has not been depressed, voice communications are established between the telephone handset and a remote communication device over the same central office line in a voice communication mode.

During the voice communications between the telephone handset and the remote communication device, if a data communication change-over key is depressed, the voice communications are manually switched to the data communications in a manual data communication mode. Alternatively, if a calling tone is received from the central office line, the voice communications are automatically switched to the data communications in an automatic data communication mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
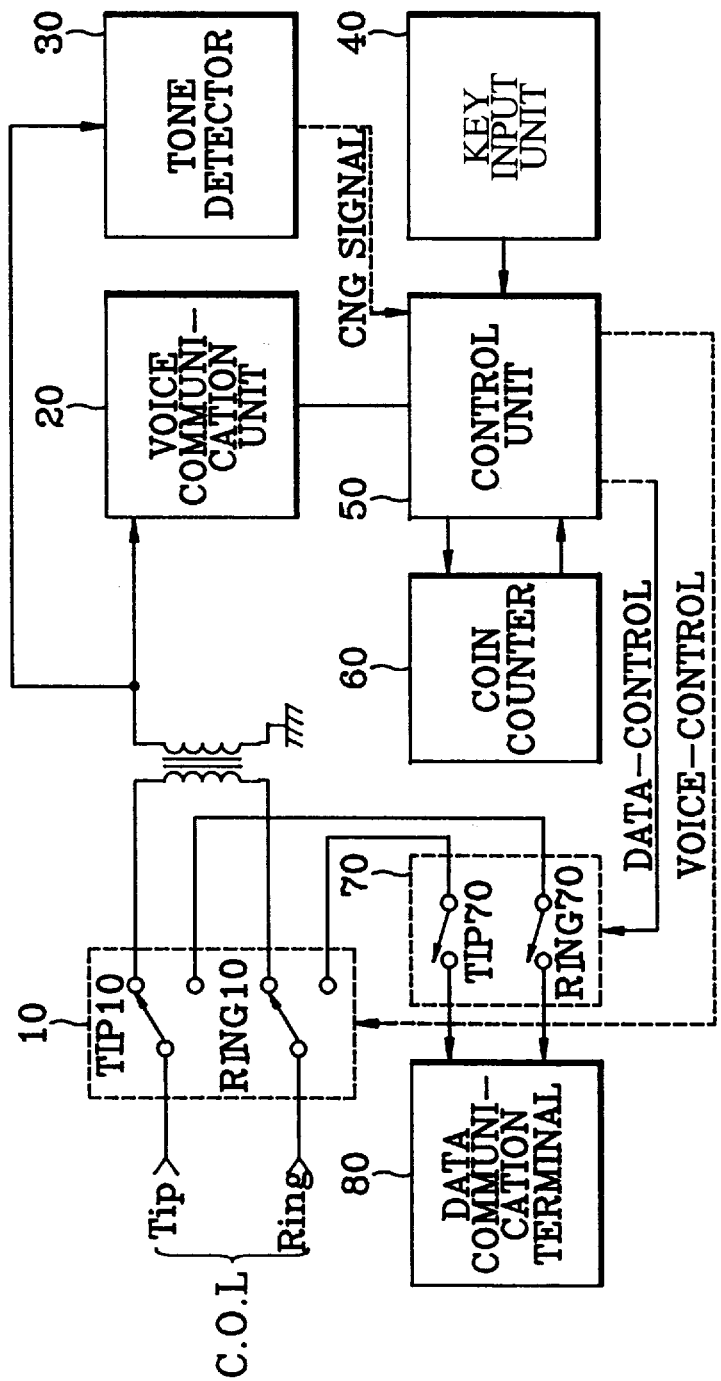
FIG. 1 is a block diagram illustrating a data communication circuit of a public telephone system constructed according to the principles of the present invention.

Referring now to the drawings and particularly to FIG. 1, which illustrates a data communication circuit of a public telephone system constructed according to the principles of the present invention. The public telephone system as contemplated is a pay phone system having a coin acceptor mechanism with a entry/exit slot for accepting coins of the requisite denomination, weight size, material or number etc. . . and a coin container removably included within the telephone system for collecting the coins inserted in the entry slot. If the coins fed into the entry slot are commensurate with parameters pre-programmed into a microprocessor of a control unit for the purpose of comparison, the coins will be accepted, with a signal contemporaneously being transmitted to the telephone handset for enabling a call. Coins which are not accepted in accordance with the pre-determined parameters in the microprocessor will be allowed to exit the exit slot. As an alternative to the coin acceptor mechanism, however, a pre-paid card reader (not shown) may be installed to read and write pre-pad debit cards and a magnetic card reader (not shown) may be adapted for reading data from standard magnetic cards.

As shown in FIG. 1, the data communication circuit of a public telephone system includes a voice switching unit 10 connected to a central office line (C.O.L) of a central exchange network for enabling transmission of a voice signal received from the central office line and for alternatively enabling transmission of a voice signal received from a user of the public telephone system to the central office line. A voice communication unit 20 is connected to the voice switching unit 10 and includes a telephone handset for enabling the user to establish voice communication with another subscriber connected to the central exchange network. A data switching unit 70 is connected to the central office line of the central exchange network for enabling transmission of data received from the central office line and for alternatively enabling transmission of data received from a data communication terminal 80, when an external data communication device is connected to the data communication terminal 80 of the telephone system. The external data communication device as contemplated by the present invention is a portable notebook computer, although a portable facsimile machine or alike may also be used. When the portable notebook computer is connected to the data communication terminal 80 for example, the tip and ring switches of the data switching unit 70 are switched on and at the same time, the tip and ring switches of the voice switching unit 10 are switched off for enabling the user to establish data communication with another data communication device connected to the central exchange network. Data received from the central office line may be stored in a given recording medium in the portable notebook computer and subsequently reproduced for printing by a printer when desired by the user.

A key input unit 40 includes an alphanumeric key pad, a data communication key and a data communication change-over key for allowing the user to selectively depress ones of these keys to generate corresponding key signals i.e., a numeric key pad signal, a data communication key signal and a data communication change-over key signal in order to establish voice communications or data communications over a telephone line. A coin counter 60 is installed to determine whether a coin of the requisite parameters is inserted into the coin slot to allow the user to initiate voice or data communications over a central office line. A control unit 50 inputs the numeric key pad signal, the data communication key signal, the data communication change-over key signal, the coin check signal and a calling tone (CNG) to thereby control the overall operation for establishing voice communications and data communications over the central office line. A tone detector 30 detects the CNG in tone signals input from the central office line to generate the CNG signal.

Figure 2:
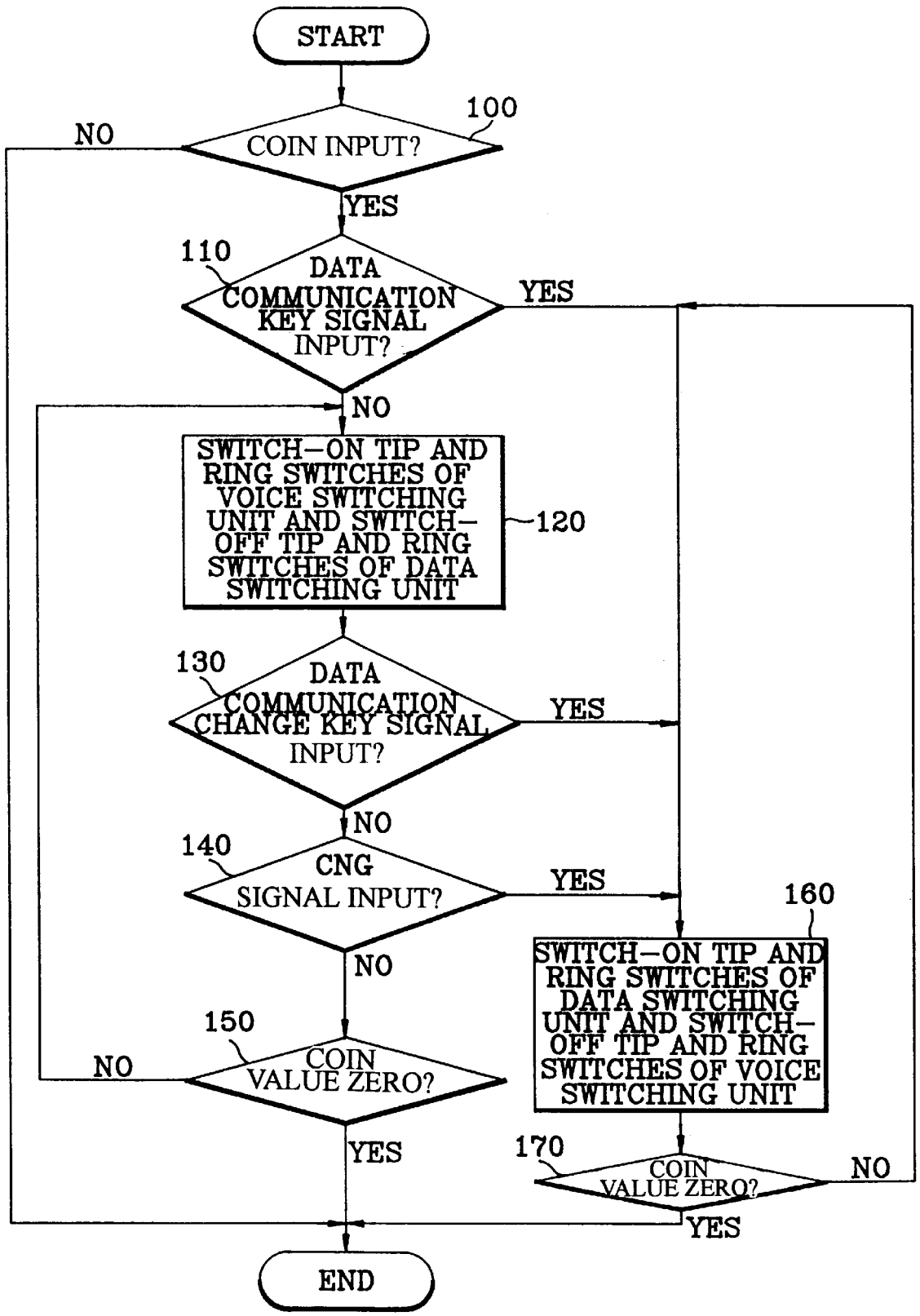
FIG. 2 is a flow chart illustrating a data communication method of the public telephone system according to the present invention.

Turning now to FIG. 2 which illustrates a data communication method of the public telephone system according to the present invention. With reference to FIGS. 1 and 2, one embodiment of the data communication method in accordance with the present invention is in detail explained as follows.

First, the control unit 50 determines whether a coin is inserted by a user into the coin slot through the coin counter 60 to initiate a call at step 100. When the coin is inserted into the coin slot at step 100, the control unit 50 determines whether a data communication key signal is generated from the key input unit 40 in response to the input of the data communication key at step 110. That is, whether the user desires to establish data communications instead of voice communications with a remote station. When the data communication key signal is generated from the key input unit 40, the control unit 50 determines that a data communication mode is designated by the user, and then proceeds to step 160. It on the other hand, the data communication key signal is not generated from the key input unit 40 at step 110, the control unit 50 proceeds to step 120. In step 160, the control unit 50 generates a data control signal to control the tip and ring switches of the data switching unit 70 to be switched-on and the tip and ring switches of the voice switching unit 10 to be switched-off in order to establish data communications with a remote data communication device connected to the central exchange network. Once the data communications are established between the user's data communication device such as a notebook computer connected to the telephone system and a remote data communication device connected to the central exchange network, the control unit 50 monitors the communication time allotted for the value of the coin inserted and determines whether the coin value reaches zero through the coin counter 60 at step 170. When the coin value reaches zero at step 170, the control unit 50 terminates the call in the data communication mode unless additional coin is inserted. When the coin value has not reached zero at step 170, the control unit 50 maintains data communications over the central office line until the coin value reaches zero.

If, on the other hand, the data communication key signal is not generated from the key input unit 40, the control unit 50 recognizes that the telephone system remains in a voice communication mode at step 110. The control unit 50 then controls the tip and ring switches of the voice switching unit 10 to be switched-on and the tip and ring switches of the data switching unit 70 to be switched-off in order to establish voice communications over the telephone line. Once voice communications are established between the user's telephone handset and a remote data communication device, the control unit 50 determines whether a data communication key signal is generated from the key input unit 40 in response to input of the data communication change-over key by the user requesting a changeover from voice to data transmission at step 130. If the data communication change signal is generated from the key input unit 40, the control unit 50 determines that a manual data communication mode is designated by the user and then proceeds to step 160 to establish data communications. Again, once data communications are established between the user's notebook computer and a remote data communication device connected to the central exchange network, the control unit 50 also monitors the communication time allotted for the value of the coin inserted and determines whether the coin value reaches zero through the coin counter 60 at step 170. When the coin value reaches zero at step 170, the control unit 50 terminates the call in the manual data communication mode.

When the data communication change-over key signal is not generated from the key input unit 40 at step 130, the control unit 50 determines whether a CNG signal is generated from the tone detector 30 in response to the tone signals received from the central office line. If the CNG signal is generated from the tone detector 30, the control unit 50 determines that an automatic data communication mode is designated to receive data from the counterpart's communication device at step 160, and then proceeds to determine whether the coin value reaches zero at step 170. If the coin value reaches zero at step 170, the control unit 50 terminates the auto data communication mode.

If, on the other hands, the CNG signal is not generated from the tone detector 30 at step 140, the control unit 50 proceeds to step 150 to monitor the communication time allotted for the value of the coin inserted and determines whether the coin value reaches zero through the coin counter 60 at step 150. When the coin value reaches zero at step 150, the control unit 50 terminates the call in the voice communication mode. If, however, the coin value has not reached zero at step 150, the voice communications between the user's telephone handset and the remote communication device are maintained until either the coin value reaches zero or when the data communication change-over key is pressed by the user requesting a changeover to data communications in a manual data communication mode and alternatively, when the CNG signal is generated from the tone detector 30 in response to the CNG tone signal received from the central office line requesting a changeover to data communications in an automatic data communication mode.

As described above, the present invention has an advantage in that the data communication can be performed by connecting the portable data communication terminal such as the notebook computer to the telephone system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A telephone system, comprising:
   a voice switching unit including tip and ring switches which are connected to a central office line to receive voice data and a ring signal, respectively;
   a key input unit having at least a data communication key, a data communication change-over key and an alpha-numeric key pad;
   a voice communication unit having a telephone handset connected to the voice switching unit for enabling voice communications between the telephone handset and a remote communication device over said central office line, when said tip and ring switches of said voice switching unit are switched-on to connect to said central office line;
   a tone detecting unit for detecting a calling tone received from said central office line;
   a data switching unit having tip and ring switches which are connected to said central office line to establish data communications between a portable data communication device connected to the telephone system with the remote communication device over said central office line, when said tip and ring switches of said data switching unit are switched-on to connect to said central office line and said tip and ring switches of said voice switching unit are switched-off to disconnect from said central office line; and
   a controlling unit for alternatively controlling establishment of said voice communications between the telephone handset and the remote communication device over said central office line, and data communications between the portable data communication device connected to the telephone system with the remote communication device over said central office line in response to selection of one of said data communication key, said data communication change-over key and said calling tone.

2. The telephone system of claim 1, further comprising means for regulating phone usage depending upon one of coinage availability and phone card insertion.

3. The telephone system of claim 1, further comprising a coin acceptor mechanism for accepting insertion of coinage before said voice communications can be established between the telephone handset and the remote communication device over the central office line, and before said data communications can be established between the portable data communication device connected to the telephone system with the remote communication device over the central office line.

4. The telephone system of claim 3, further comprised of said controlling unit controlling said voice switching unit and said data switching unit to establish said voice communications and said data communications by:

determining whether a coin is inserted by the user into a coin entry slot of said coin acceptor mechanism;

determining whether said data communication key has been depressed by the user requesting said data communications between the portable data communication device connected to the telephone system and the remote communication device over the central office line, when the coin is inserted into said coin entry slot;

establishing said voice communications between the telephone handset and the remote communication device over the central office line by switching on said tip and ring switches of said voice switching unit and simultaneously switching off said tip and ring switches of said data switching unit, when said data communication key has not been depressed by the user;

determining whether said data communication change-over key has been depressed by the user requesting a changeover from said voice communications to said data communications during said voice communications;

establishing said data communications between the portable data communication device connected to the telephone system and the remote communication device over the central office line by switching off said tip and ring switches of said voice switching unit and simultaneously switching on said tip and ring switches of said data switching unit, when said data communication change-over key has been depressed by the user;

determining whether the calling tone is received from the central office line during said voice communications, when said data communication change-over key has not been depressed by the user;

establishing said data communications between the portable data communication device connected to the telephone system and the remote communication device over the central office line by switching off said tip and ring switches of said voice switching unit and simultaneously switching on said tip and ring switches of said data switching unit, when said calling tone is received from the central office line; and monitoring a communication time allotted for the value of the coin inserted by the user for one of said voice communications and said data communications and determining whether the coin value reaches zero to terminate said voice communications and said data communications.

5. The telephone system of claim 1, further comprised of said controlling unit controlling said voice switching unit and said data switching unit to establish said voice communications and said data communications by:

determining whether said data communication key has been depressed by the user requesting said data communications between the portable data communication device and the remote communication device over the central office line, when the portable data communication device is connected to the telephone system;

establishing said voice communications between the telephone handset and the remote communication device over the central office line by switching on said tip and ring switches of said voice switching unit and simultaneously switching off said tip and ring switches of said data switching unit, when said data communication key has not been depressed by the user;

determining whether said data communication change-over key has been depressed by the user requesting a changeover from said voice communications to said data communications during said voice communications;

establishing said data communications between the portable data communication device connected to the telephone system and the remote communication device over the central office line by switching off said tip and ring switches of said voice switching unit and simultaneously switching on said tip and ring switches of said data switching unit, when said data communication change-over key has been depressed by the user;

determining whether the calling tone is received from the central office line during said voice communications, when said data communication change-over key has not been depressed by the user; and establishing said data communications between the portable data communication device connected to the telephone system and the remote communication device over the central office line by switching off said tip and ring switches of said voice switching unit and simultaneously switching on said tip and ring switches of said data switching unit, when said calling tone is received from the central office line.

6. A data communication method of a telephone system comprising the steps of:

determining whether a portable communication device is plugged in a data receptacle of said telephone system having a telephone handset, a voice switching unit comprising tip and ring switches operable to connect to a telephone line from a telephone network for voice communications, a data switching unit comprising tip and ring switches operable to connect to said telephone line for data communications, and a keypad comprising a data communication key and a data communication change-over key, and whether said data communication key of said keypad is depressed by a user;

when the portable data communication device is plugged in the data receptacle of said telephone system and said data communication key of said keypad is depressed, establishing data communications between the portable data communication device and a remote communication device via said telephone line by connecting said tip and ring switches of said data switching unit to said telephone line while simultaneously disconnecting said tip and ring switches of said voice switching unit from said telephone line;

when said data communication key of said keypad is not depressed, establishing voice communications between the telephone handset and the remote communication device by electrically connecting said tip and ring switches of said voice switching unit to said telephone line while simultaneously disconnecting said tip and ring switches of said data switching unit from said telephone line; and manually switching over from said voice communications to said data communications, when said data communication change-over key is depressed during said voice communications.

7. A data communication method of a telephone system comprising the steps of:

determining whether a portable communication device is plugged in a data receptacle of said telephone system having a telephone handset, a voice switching unit comprising tip and ring switches operable to connect to a telephone line from a telephone network for voice communications, a data switching unit comprising tip and ring switches operable to connect to said telephone line for data communications, and a keypad comprising a data communication key and a data communication change-over key, and whether said data communication key of said keypad is depressed by a user;

when the portable data communication device is plugged into the data receptacle of said telephone system and said data communication key of said keypad is depressed, establishing data communications between the portable data communication device and a remote communication device over said telephone line by connecting said tip and ring switches of said data switching unit to said telephone line while simultaneously disconnecting said tip and ring switches of said voice switching unit from said telephone line;

when said data communication key of said keypad is not depressed, establishing voice communications between the telephone handset and a remote communication device over said telephone line by electrically connecting said tip and ring switches of said voice switching unit to said telephone line while simultaneously disconnecting said tip and ring switches of said data switching unit from said telephone line; and automatically switching over from said voice communications to said data communications, when a calling tone is received from said telephone line during said voice communications.

8. The data communication method of claim 6, comprised of automatically switching from said voice communications to said data communications when a calling tone is received from said telephone line during said voice communications.

9. A telephone system, comprising:

a key input unit comprising a plurality of discrete keys including a data communication key, a data communication change-over key;

a telephone handset;

a voice switching unit having tip and ring switches connectable to a common telephone line of a telephone network to establish voice communications between the telephone handset and a first remote communication device via said common telephone line;

a voice communication unit electrically connected to the voice switching unit for enabling voice communications between the telephone handset and the first remote communication device via said common telephone line, when said tip and ring switches of said voice switching unit are electrically connected to said common telephone line;

a data switching unit having tip and ring switches connectable to said common telephone line to establish data communications between a portable data communication device connectable to the telephone system and a second remote communication device via said common telephone line, when said tip and ring switches of said data switching unit are electrically connected to said common telephone line and said tip and ring switches of said voice switching unit are electrically disconnected from said common telephone line; and a controller for controlling establishment of said voice communications between the telephone handset and the first remote communication device via said common telephone line, and data communications between the portable data communication device and the second remote communication device via said common telephone line in response to selection of one of said data communication key and said data communication change-over key.

10. The telephone system of claim 9, further comprising means for regulating phone usage depending upon one of coinage availability and phone card insertion.

11. The telephone system of claim 9, further comprising a coin acceptor mechanism for accepting insertion of coinage before said voice communications can be established between the telephone handset and the first remote communication device via said common telephone line, and before said data communications can be established between the portable data communication device and the second remote communication device via said common telephone line.

12. The telephone system of claim 9, further comprised of said controller controlling said voice switching unit and said data switching unit to establish said voice communications and said data communications by:

determining whether a coin is inserted by the user into a coin entry slot of said coin acceptor mechanism;

determining whether said data communication key has been depressed by the user requesting said data communications between the portable data communication device connectable to the telephone system and the second remote communication device over said common telephone line, when the coin is inserted into said coin entry slot;

establishing said voice communications between the telephone handset and the first remote communication device over said common telephone line by switching on said tip and ring switches of said voice switching unit for electrically connection with said common telephone line while simultaneously switching off said tip and ring switches of said data switching unit for electrically disconnection from said common telephone line, when said data communication key has not been depressed by the user;

determining whether said data communication change-over key has been depressed by the user requesting a changeover from said voice communications to said data communications during said voice communications;

establishing said data communications between the portable data communication device and the second remote communication device over said common telephone line by switching off said tip and ring switches of said voice switching unit while simultaneously switching on said tip and ring switches of said data switching unit, when said data communication change-over key has been depressed by the user;

determining whether the calling tone is received from said common telephone line during said voice communications, when said data communication change-over key has not been depressed by the user;

establishing said data communications between the portable data communication device and the second remote communication device over said common telephone line by switching off said tip and ring switches of said voice switching unit while simultaneously switching on said tip and ring switches of said data switching unit, when said calling tone is received from said common telephone line; and monitoring a communication time allotted for the value of the coin inserted by the user for one of said voice communications and said data communications and determining whether the coin value reaches zero to terminate said voice communications and said data communications.

13. The telephone system of claim 12, further comprising means for regulating phone usage depending upon one of coinage availability and phone card insertion.

14. The telephone system of claim 12, further comprising a coin acceptor mechanism for accepting insertion of coinage before said voice communications can be established between the telephone handset and the first remote communication device over said common telephone line, and before said data communications can be established between the portable data communication device connected to the telephone system with the second remote communication device over said common telephone line.

15. The telephone system of claim 9, further comprised of said controller controlling said voice switching unit and said data switching unit to establish said voice communications and said data communications by:

determining whether said data communication key has been depressed by the user requesting said data communications between the portable data communication device and the second remote communication device over said common telephone line, when the portable data communication device is connected to the telephone system;

establishing said voice communications between the telephone handset and the first remote communication device over said common telephone line by switching on said tip and ring switches of said voice switching unit for electrical connection to said common telephone line while simultaneously switching off said tip and ring switches of said data switching unit for electrical disconnection from said common telephone line, when said data communication key has not been depressed by the user;

determining whether said data communication change-over key has been depressed by the user requesting a changeover from said voice communications to said data communications during said voice communications;

establishing said data communications between the portable data communication device and the first remote communication device over the central office line by switching off said tip and ring switches of said voice switching unit while simultaneously switching on said tip and ring switches of said data switching unit, when said data communication change-over key has been depressed by the user;

determining whether the calling tone is received from said common telephone line during said voice communications, when said data communication change-over key has not been depressed by the user; and establishing said data communications between the portable data communication device and the second remote communication device over said common telephone line by switching off said tip and ring switches of said voice switching unit while simultaneously switching on said tip and ring switches of said data switching unit, when said calling tone is received from said common telephone line.

16. The telephone system of claim 15, further comprising means for regulating phone usage depending upon one of coinage availability and phone card insertion.

17. The telephone system of claim 15, further comprising a coin acceptor mechanism for accepting insertion of coinage before said voice communications can be established between the telephone handset and the first remote communication device over said common telephone line, and before said data communications can be established between the portable data communication device connected to the telephone system with the second remote communication device over said common telephone line.

* * * * *